US007796866B2

(12) United States Patent
Lee

(10) Patent No.: US 7,796,866 B2
(45) Date of Patent: Sep. 14, 2010

(54) DIGITAL VERSATILE DISC RECORDING APPARATUS AND CELL-BY-CELL EDITION METHOD USING THE SAME

(75) Inventor: Sang Am Lee, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 1235 days.

(21) Appl. No.: 11/362,760

(22) Filed: Feb. 28, 2006

(65) Prior Publication Data

US 2006/0210247 A1 Sep. 21, 2006

(30) Foreign Application Priority Data

Mar. 21, 2005 (KR) ...................... 10-2005-0023181

(51) Int. Cl.
*H04N 5/00* (2006.01)
*H04N 5/93* (2006.01)
(52) U.S. Cl. ........................................ 386/125; 386/52
(58) Field of Classification Search .................. 386/46, 386/125, 124, 45, 52, 55, 68, 109, 111, 112
See application file for complete search history.

(56) References Cited

U.S. PATENT DOCUMENTS 7,532,806 B2 * 5/2009 Ando et al. .................. 386/95

FOREIGN PATENT DOCUMENTS

| CN | 1180229 A | 4/1998 |
| CN | 1243597 | 2/2000 |
| EP | 0 810 794 | 12/1997 |
| EP | 0810794 | 12/1997 |
| KR | 10-221429 | 9/1999 |
| KR | 2003-67248 | 8/2003 |

OTHER PUBLICATIONS

First Office Action issued in Chinese Patent Application No. 200610058870X on Feb. 6, 2009.
Office Action issued in European Patent Application No. 06110794.2 on Mar. 28, 2007.
Chinese Office Action issued Jul. 24, 2009, in Chinese Patent Application No. 200610058870X.

* cited by examiner

*Primary Examiner*—Robert Chevalier
(74) *Attorney, Agent, or Firm*—Stanzione & Kim LLP

(57) ABSTRACT

A digital versatile disc (DVD) recording apparatus and a cell-by-cell edition method using the same are provided. The DVD recording apparatus records images on a DVD in video format when the DVD is loaded on a DVD drive. The cell-by-cell edition method comprises recording the image on the DVD and temporarily storing cell information in relation to a plurality of cells constituting the image; displaying a representative image of the plurality of cells on a graphical user interface (GUI) which is connected to the DVD recording apparatus; and creating navigation data using the cell information when a user edits the plurality of cells while viewing the representative image, and storing the created navigation data on the DVD.

16 Claims, 9 Drawing Sheets

DIGITAL VERSATILE DISC RECORDING APPARATUS AND CELL-BY-CELL EDITION METHOD USING THE SAME

CROSS-REFERENCE TO RELATED APPLICATIONS

This application claims all benefits accruing under 35 U.S.C. §119 from Korean Patent Application No. 2005-23181, filed on Mar. 21, 2005 in the Korean Intellectual Property Office, the disclosure of which is incorporated by reference herein.

BACKGROUND OF THE INVENTION

1. Field of the Invention

The present invention relates to a recording apparatus and a cell-by-cell edition method using the same, and more particularly to a digital versatile disc (DVD) recording apparatus for cell-by-cell editing a recorded image which is composed of a plurality of cells, and a cell-by-cell edition method using the same.

2. Related Art

Recently, DVD recorders have been widely used as devices for recording television broadcasts or photographed images, instead of video tape recorders. The DVD recorders adopt recording DVDs as recording media. The recording DVDs may be, for example, a write-once DVD-R, a DVD-RW appropriate to video recording, a DVD-RAM appropriate to PC data recording, and so forth.

A typical DVD recorder includes a loader engine, as disclosed in Korean Patent Laid-open Publication No. 10-2003-0067248. Such a loader engine comprises a video and audio (A/V) encoder module, an A/V decoder module, a hard disk drive (HDD) and a DVD drive. When A/V data is inputted through an A/V input terminal, the A/V data is encoded or decoded in accordance with a MPEG (Moving Picture Experts Group) format by the A/V encoder module or the A/V decoder module, respectively.

In the typical DVD recorder, when A/V data is inputted, the A/V data is encoded in accordance with the MPEG format by the A/V encoder module, and the encoded A/V data is then recoded on the DVD-R/RW loaded to the DVD drive.

Meanwhile, when an image is recorded on the DVD-R/RW in a video format, such an image is stored in a plurality of video title sets (VTSs) (up to 99 titles can be recorded) as described in Korean Patent Registration Publication No. 10-0221429. Each of the VTSs is composed of video title set information (VTSI), a video object set (VOBS) and a backup of the video title set information (VTSI_BUP). The VTSI is title management information, and the VOBS has video data and audio data. Thus, DVD apparatuses, such as a DVD recorder, can reproduce a recorded image using the VTSI, etc.

However, in such a typical DVD recorder for recording an image in a video format, when the image recorded on the DVD is reproduced, all titles must be reproduced even though a part of the titles needs not be reproduced. In addition, even when a user desires to reproduce only a predetermined part of the recorded titles, the user must reproduce all titles, thereby further reproducing the part of the titles which the user does not desire to reproduce. In order words, in a typical DVD recorder for recording an image in a video format, the user cannot selectively reproduce a part of a recorded image. As a result, image reproduction can be inflexible and disadvantageous, since the user has to reproduce all titles pertaining to an image.

SUMMARY OF THE INVENTION

Various aspects and example embodiments of the present invention provide a DVD recording apparatus and a cell-by-cell edition method using the same, in which a user can perform cell-by-cell edition of a recorded image which is composed of a plurality of cells, and can selectively reproduce a part of the recorded image.

Additional aspects and/or advantages of the invention will be set forth in part in the description which follows and, in part, will be obvious from the description, or may be learned by practice of the invention.

In accordance with an aspect of the present invention, a cell-by-cell edition method of a digital versatile disc (DVD) recording apparatus is provided to record images on a DVD in a video format when the DVD is loaded on a DVD drive. Such a method comprises: recording the image on the DVD and temporarily storing cell information in relation to a plurality of cells constituting the image; displaying a representative image of the plurality of cells on a graphical user interface (GUI) which is connected to the DVD recording apparatus; and creating navigation data using the cell information when a user edits the plurality of cells while viewing the representative image, and storing the created navigation data on the DVD.

The representative image may be displayed on the GUI in a thumbnail scheme. The representative image may be any one of intra-pictures which belong to a corresponding cell among the plurality of cells.

The user manually designates a starting point of each cell when the image is recorded on the DVD.

A recording of a cell under recording is stopped when the user manually designates the starting point of each cell, and the cell information in relation to the recorded cell is stored in a storage medium of the DVD recording apparatus.

A starting point of each cell may be automatically designated when the image is recoded in the DVD. The starting point of each cell may be automatically designated by a predetermined period of time or by a point of time for performing a scene change.

A recording of a cell under recording is stopped when the starting point of each cell is automatically designated, and the cell information in relation to the recorded cell is stored in a storage medium of the DVD recorder.

The navigation data may be program chain information (PGCI).

In accordance with another aspect of the present invention, there is provided a cell-by-cell edition method of a digital versatile disc (DVD) recording apparatus which records images on a DVD in video format when the DVD is loaded on a DVD drive. Such a method comprises: recording an image on the DVD, and temporarily storing cell information in relation to a plurality of cells constituting the image; displaying a representative image of the plurality of cells on a graphical user interface (GUI) which is connected to the DVD recording apparatus; and creating navigation data in response to a user's selection using the cell information when the user selects a reproduction or deletion of the plurality of cells while viewing the representative image, and storing the created navigation data on the DVD.

In accordance with yet another aspect of the present invention, there is provided a DVD recording apparatus comprising: a DVD drive arranged to receive a DVD, for recording an image on the DVD or reading the recorded image from the DVD; and a control unit for storing cell information in relation to a plurality of cells constituting the image, creating navigation data using the cell information while a user is editing each cell in a cell-by-cell edition, and storing the created navigation data on the DVD.

The cell-by-cell edition may be performed to select a deletion or reproduction of each cell. The control unit may control a representative image of the plurality of cells to display on a graphical user interface (GUI) which is connected to the DVD recording apparatus.

The representative image of the plurality of cells may be displayed on the GUI in a thumbnail scheme. The navigation data may be program chain information (PGCI).

In addition to the example embodiments and aspects as described above, further aspects and embodiments of the present invention will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF THE EMBODIMENTS

Figure 1:
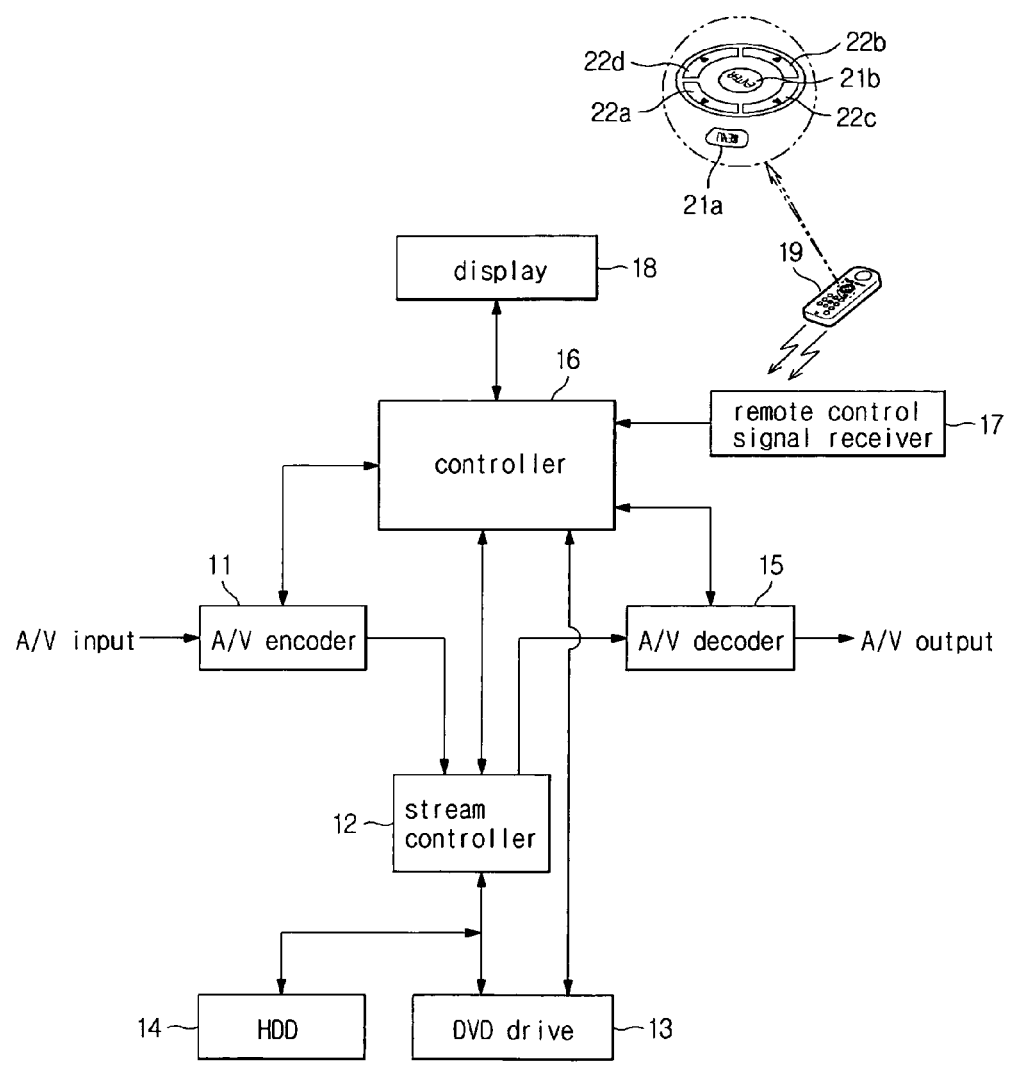
FIG. 1 is a block diagram of an example DVD recorder according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a block diagram showing the configuration of an example DVD recorder according to an embodiment of the present invention. As shown in FIG. 1, the DVD recorder comprises an audio/video (A/V) encoder 11, a stream controller 12, a DVD drive 13, a hard disk drive (HDD) 14, an A/V decoder 15, a controller 16, a receiver 17 and a display 18. The audio/video (A/V) encoder 11 compresses an audio/video (A/V) signal inputted through an A/V input terminal (not shown) in accordance with a MPEG-2 (Motion Picture Experts Group-2) standard. The stream controller 12 controls the transmission of an A/V data stream from the A/V encoder 11. The DVD drive 13 loads a DVD therein and records or reproduces an A/V data stream on or from the DVD. The A/V decoder 15 decodes an A/V data stream, and the controller 16 controls operation of the above-mentioned components, i.e., the A/V encoder 11, the stream controller 12, the DVD drive 13, the HDD 14, the A/V decoder 15 and the display 18. The remote control signal receiver 17 receives a control signal from a remote controller 19 and transmits the same to the controller 16.

As shown in FIG. 1, the remote controller 19 contains a MENU button 21a, an ENTER button 21b, and up, down, left and right direction buttons 22a, 22b, 22c and 22d. The MENU button 21a is used to load or close a menu screen on a graphical user interface (GUI) (not shown) connected to the DVD recorder. The ENTER button 21b is used to select an item. The direction buttons 22a, 22b, 22c and 22d are used to move between items displayed on the menu screen.

In the DVD recorder, when the A/V data is inputted to the A/V input terminal during a recording mode, the A/V data is compressed in accordance with the MPEG2 scheme and is then stored on the DVD in the form of a data stream. In contrast, during a playback mode, the data stream stored on the DVD is read from the DVD and then decoded by the A/V decoder 15, and subsequently displayed as an image through the graphical user interface (GUI) connected to the DVD recorder.

Figure 2:
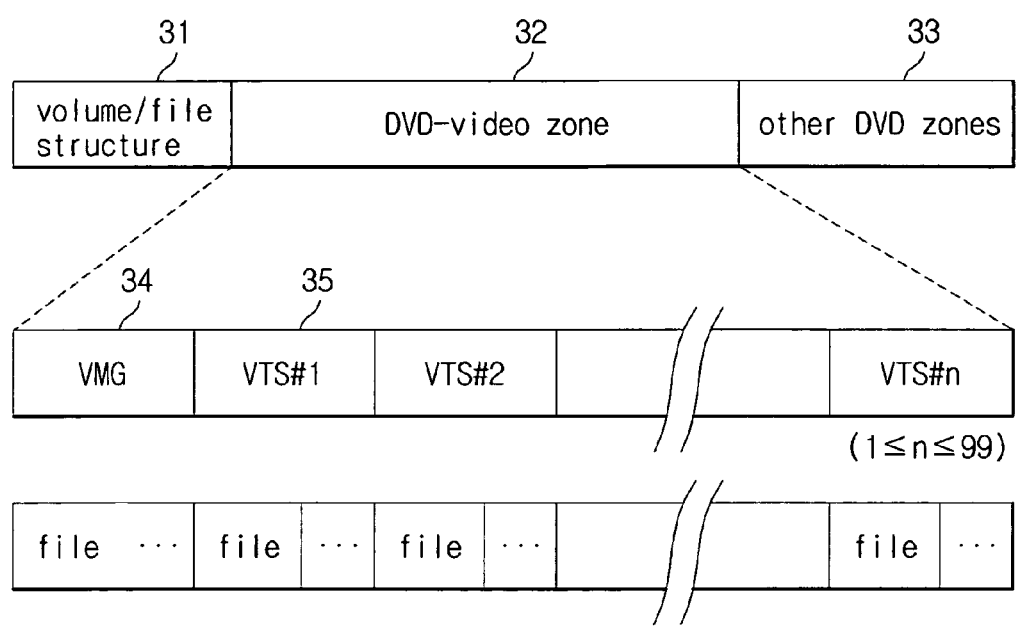
FIG. 2 is a view of an example logical data structure of a DVD-video disc according to an embodiment of the present invention.

FIG. 2 shows an example logical data structure of a DVD-video disc. As shown in FIG. 2, the DVD-video disc is divided into a volume/file structure 31, a DVD-video zone 32, and other DVD zones 33. The DVD-video zone 31 is subdivided into a video manager (VMG) 34 and a plurality of video title sets (VTSs) 35. The VMG 34 is created by finalization and may be composed of a plurality of files that store information for managing the VTSs 35. As will be described later in detail, the VTSs 35 include video data, audio data and sub-picture data, and up to 99 VTSs can be created in a single DVD-video zone 32. The volume/file structure 31 is a management area which is defined by a universal disk format (UDF) bridge.

The VTS 35 is composed of video title set information (VTSI) used for one or more video titles and video title set menu, a video object set (VOBS) and a backup of the video title set information (VTSI_BUP) which serves as a backup of the VTSI. The video title set information (VTSI) may contain a video title set program chain information table (VTS_PGCIT) to enable the DVD recorder as shown in FIG. 1 to determine the sequence of cells for reproduction.

Figure 3:
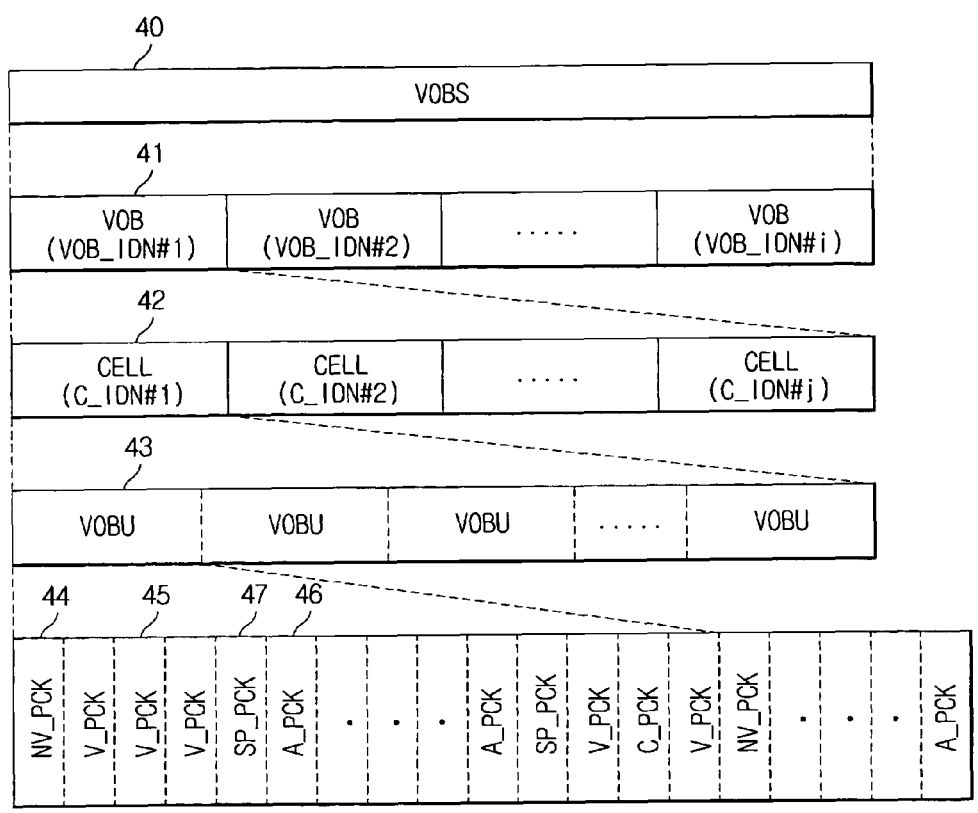
FIG. 3 is a detailed view of an example video object set (VOBS) shown in FIG. 2.

FIG. 3 is a detailed view of an example video object set (VOBS) shown in FIG. 2. As shown in FIG. 3, each VOBS 40 has a plurality of video objects (VOBs) 41. Each VOB 41 is assigned an identification (ID) number VOB_IDN #i (where "i" is a natural number) to specify a corresponding one of the VOBs 41. Each VOB 41 is composed of at least one cell 42 which is assigned an ID number C_IDN #j (where "j" is a natural number) similarly to the VOB 41.

Each cell 42 is composed of at least one video object unit (VOBU) 43, wherein the VOBU 43 is a pack train including one navigation pack (NV_PCK) 44 placed at the header thereof, and video packs (V_PCK) 45, audio packs (A_PCK) 46 and sub-picture packs (SP_PCK) 47 placed subsequently to the NV_PCK 44. That is, the VOBU 43 can be considered to be a set of packs from one NV_PCK 44 to the next NV_PCK. Herein, the playback time of the VOBU 43 is equal to that of video data contained in the VOBU 43, which is set to any value within the range of 0.4 to 1 sec.

Figure 4:
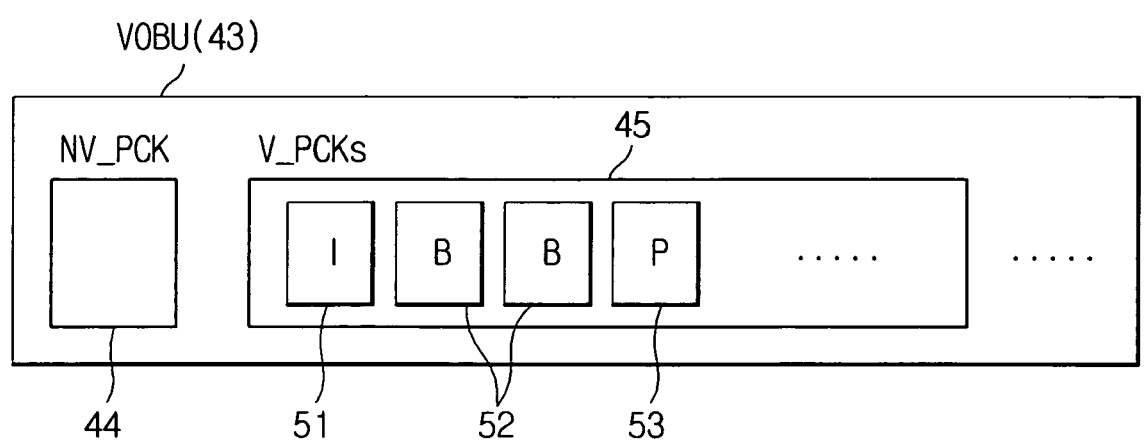
FIG. 4 is a view of example pictures stored in a video pack included in a video object unit (VOBU) shown in FIG. 3.

FIG. 4 is a view of example pictures stored in a video pack which is included in a VOBU shown in FIG. 3. As shown in FIG. 4, the V_PCK 45 includes a group of pictures (GOPs) composed of at least an intra-picture (I-picture) 51, a bidirectional picture (B-picture) 52 and predicted picture (P-picture) 53. Herein, the I-picture 51 is an intra coded picture (that is, a coded picture in a frame) using only information present in the picture. In contrast to the I-picture 51, the B-picture 52 is a bidirectionally predictive coded picture that uses both a past and future picture as a reference. Similarly, the P-picture 53 is a predictive coded picture (that is, an interframe unidirectionally predictive code picture) with respect to the nearest previous I-picture 51 or P-picture 53. Like the I-picture 51, the P-picture can also serve as a prediction reference for B-pictures and future P-pictures. The group of pictures (GOPs) is defined in accordance with the MPEG standard.

Figure 5:
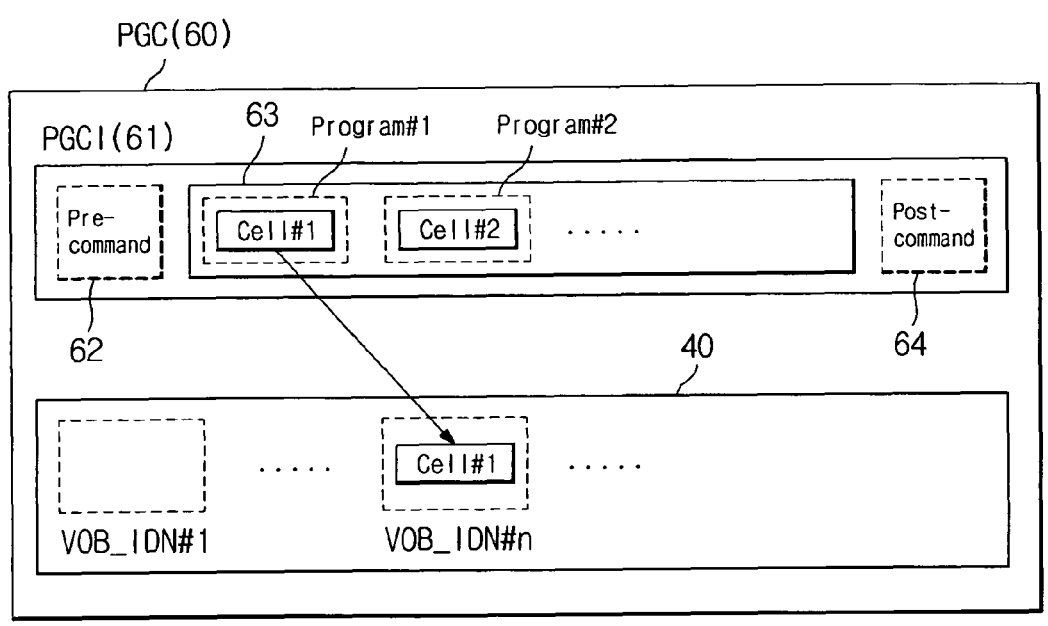
FIG. 5 is a view of an example program chain (PGC) according to an embodiment of the present invention.

FIG. 5 is a view of an example program chain (PGC) according to an embodiment of the present invention. As shown in FIG. 5, a program chain (PGC) 60 is composed of a plurality of programs, and includes playback information, referred to as the program chain information (PGCI) 61 and the VOBS 40, wherein the VOBS 40 has a plurality of cells in which the cells in VOBS 40 are needed for the playback of PGC. The PGCI 61 represents navigation data for controlling a presentation of the PGC 60, and contains a pre-command block 62, a presentation control block 63 and a post-command block 64.

The presentation control block 63 includes a start address of each cell, etc., and contains a cell playback information table and a program playback mode, etc., wherein the cell playback information table is a table for setting up a sequence of cells to reproduce.

On the other hand, since the PGC 60 is stored in a video title set program chain information table (VTS_PGCIT) of the video title set information (VTSI) as described in connection with FIG. 2, the DVD recorder can find out the sequence of cells to reproduce using the VTS_PGCIT.

Figure 6:
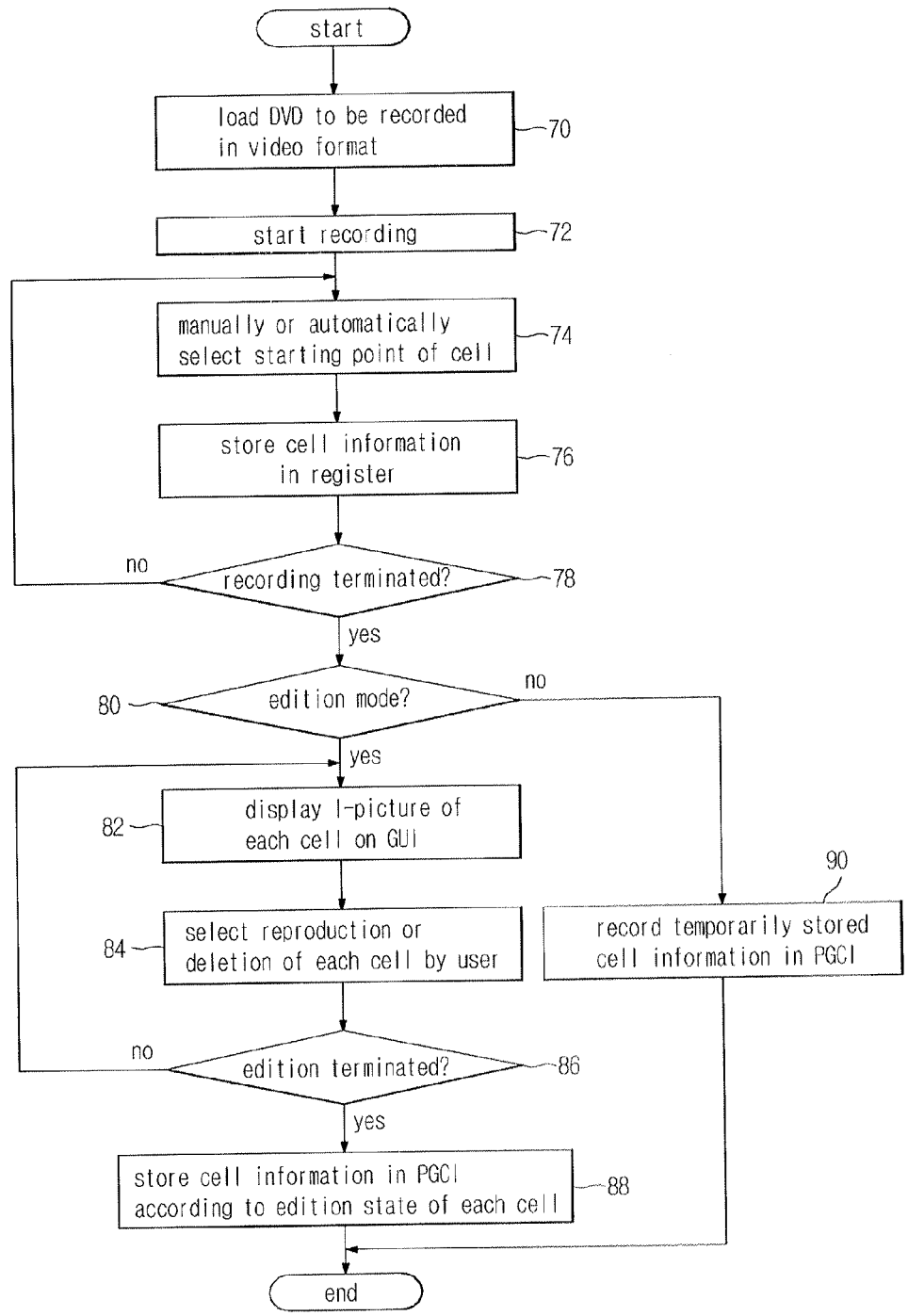
FIG. 6 is a flow chart of an example cell-by-cell edition method in the DVD recorder shown in FIG. 1.
Figure 7:
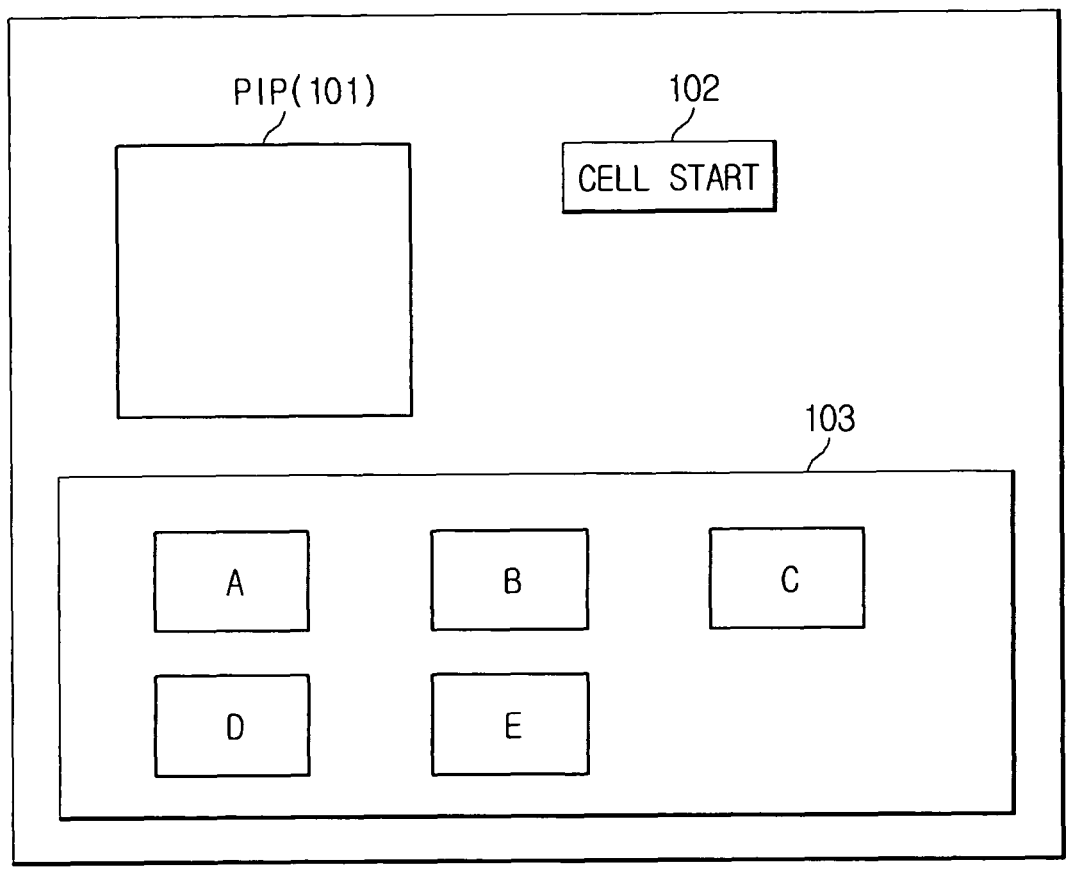
FIG. 7 is a view of a graphical user interface (GUI) screen which a user can designate a starting point of cell, in the cell-by-cell edition method shown in FIG. 6.

FIG. 6 is a flow chart illustrating a cell-by-cell edition method in the DVD recorder in FIG. 1, and FIG. 7 is a view of a GUI screen which a user can designate a starting point of cell in the cell-by-cell edition method in FIG. 6. Referring to FIG. 6, a cell-by-cell edition method in the DVD recorder according to an embodiment of the present invention will be explained herein below.

Firstly, a DVD which can record an image in a video format is loaded on the DVD recorder at block 70. Next, when a user selects a recording item among various menu items (for example, a recording item, a reproducing item and a setup item, etc.) which are displayed by pushing a menu button 21a of the remote controller 19, as shown in FIG. 1, the recording is started at block 72. Otherwise, when a reservation recording start time is selected, the recording may be started at block 72.

Next, when the recording is performed, the user can conveniently select a starting point of a cell at block 74. Referring to FIG. 7, a graphical user interface (GUI) screen is provided so that the user can select the starting point of cell. The GUI screen illustrates a picture in picture (PIP) window 101 for displaying an image under recording at the left upper side thereon and a CELL START button 102 at the right side of the PIP window 101. Further, the GUI screen illustrates a display block of a representative image 103 on the bottom side of the PIP window 101 and the CELL START button 102. The display block of a representative image 103 illustrates successive screens (A to E) for the starting points of cells selected by the user.

While viewing an image displayed in the PIP window 101 on the GUI screen, a user may view another image with a new cell to be displayed in the PIP window 101. If the CELL START button 102 (using an enter button 21b of the remote controller 19 shown in FIG. 1) is pushed by the user, a new cell may be started at that time. Therefore, if the user pushes the CELL START button 102, the past cell is stopped and the new cell is started. For example, in the case where video data and audio data are recording in CELL #2, if the user pushes the CELL START button 102, CELL #2 is stopped and CELL #3 is started.

As described in connection with FIG. 6, as though the user manually selects a starting point of the new cell, the user may automatically select the starting point of the new cell. For example, the new cell may be started automatically at a predetermined period of time. Otherwise, when a scene change is detected, the new cell may be started at a point of time of the scene change.

Regardless of whether the starting point of the new cell is manually or automatically designated, the control unit 16 stores cell information of each cell in a temporary storage of the control unit 16, such as a register (not shown), a random access memory (RAM) (not shown), and so forth. The cell information represents information to specify the cell, and contains an identification number (IDN) of the cell, a start address and an end address of the cell, and so forth. The cell information is temporarily stored in the DVD recorder, while A/V data is recorded on the DVD.

Next, the control unit 16 determines whether the recording is terminated or not at block 78. If the recording is not terminated, the control unit 16 returns to determine if the user selects a starting point of cell at block 74. Otherwise, if the recording is terminated, the control unit 16 determines whether a current mode is an edition mode at block 80. The edition mode is set when the user selects an edition item among the menu items.

Figure 8A:
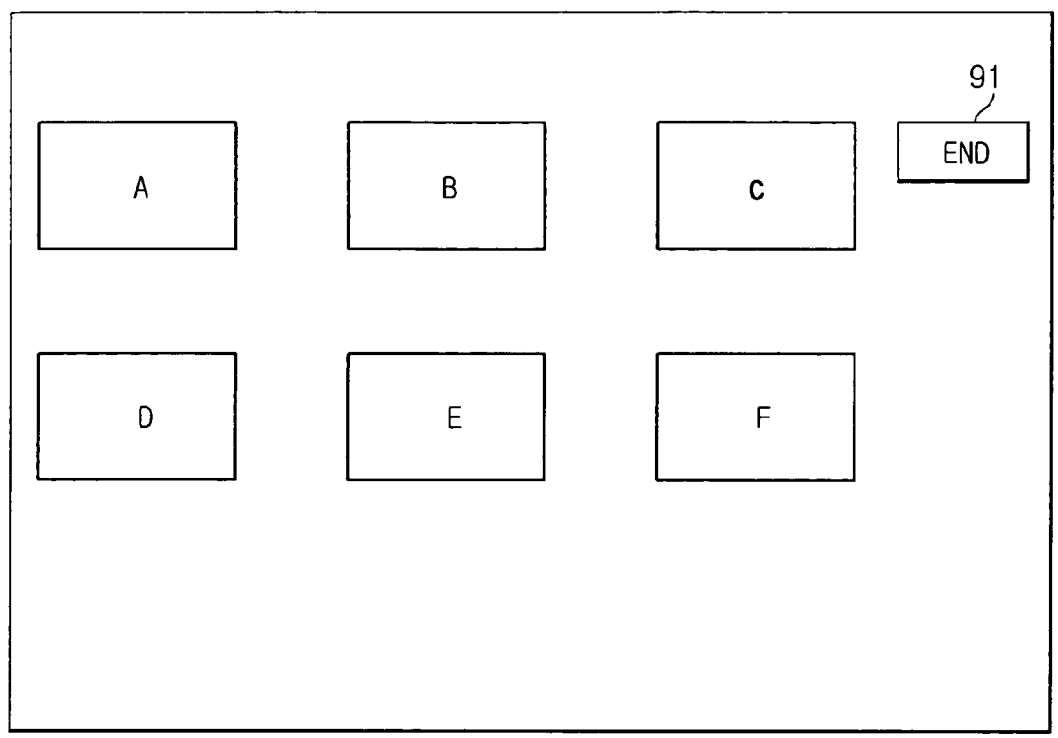
FIGS. 8A and 8B are views illustrating the cell-by-cell edition procedures in the cell-by-cell edition method shown in FIG. 6.
Figure 8B:
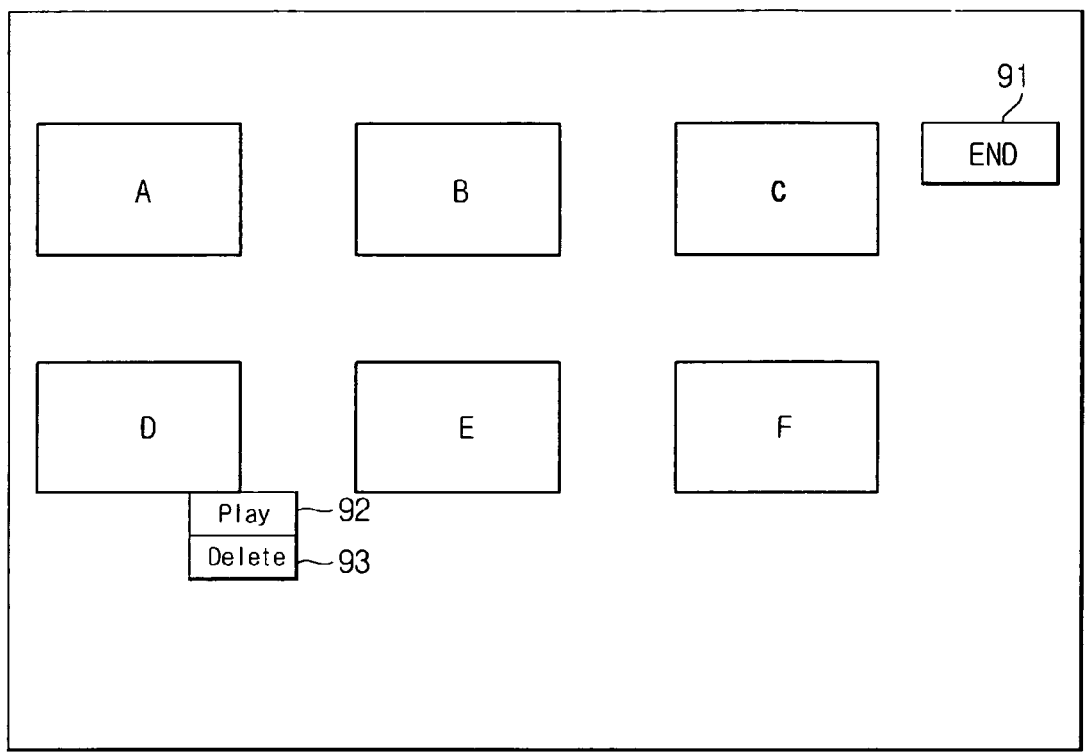

FIGS. 8A and 8B are views illustrating the cell-by-cell edition procedures in the cell-by-cell edition method shown in FIG. 6. In the edition mode, as shown in FIG. 8A, the control unit 16 controls, in a thumbnail scheme, representative images (A to F) of each cell to be displayed at block 82. Herein, it is preferred that the representative image is the leading I-picture among a plurality of I-pictures included in each cell. In addition, as shown in FIG. 8A, when the representative image of each cell goes from the left side to the right side and from the upper side to the bottom side, it represents an I-picture of a late recorded image. Further, if cells to set up the representative images are exceedingly numerous, the representative images of all cells cannot be displayed in one page. Thus, by preparing a plurality of pages, the representative images of all cells can be successively displayed. In addition, at the right side of the representative image, an END button 91 is arranged to use when the user wants to terminate the edition.

On the other hand, as shown in FIG. 8B, the user edits the cell while viewing the representative image of each cell at block 84. Concretely, during an edition of the cell, if a representative image of a cell to edit is activated, the user pushes the menu button 21a on the remote controller 19, shown in FIG. 1. Then, a play item 92 or a delete item 93 is displayed at the right bottom of the representative image. As shown in FIG. 8B, when the representative images (A to F) are displayed, the representative image (A) at the left upper side is firstly activated. Then, when the user pushes upper, bottom, left or right moving buttons 22a, 22b, 22c, 22d, the representative images of the upper or bottom side and the left or right side are successively activated. In addition, the representative image is activated when a representative image is more highlighted than other representative images, or when a colored band is formed at the rim (i.e., perimeter) of a representative image.

Items 92 and 93 may be displayed at the right bottom side of each representative image. If the user selects the play item 92 or the delete item 93 using the ENTER button 21 b on the remote controller 19, shown in FIG. 1, a cell edition result is stored in the temporary storage. Herein, even though the user selects the delete item 93, A/V data which is stored in each cell of the DVD, is not deleted, and only the playback is not performed.

Whenever each cell edition result is inputted, the control unit 16 determines whether the edition is terminated at block 86. If the edition is not terminated, the control unit 16 returns to display I-picture of each cell on the GUI screen at block 82. If the edition is terminated, cell information in relation to the edition result is stored in the program chain information (PGCI) 61 at block 88. For example, as shown in FIG. 8A, when the user edits to delete cells having A and B representative images which are displayed in one page, cell information in relation to the cells having A and B representative images are not recorded in the program chain information (PGCI) 61, and cell information in relation to other cells to reproduce are only recorded. Thus, when cells having C, D, E, F representative images are reproduced, the cells are successively displayed on the GUI screen.

In addition, if the user does not select the edition item at block 80, the control unit 16 causes the temporarily stored cell information to be recorded in the program chain information (PGCI) 61 of the DVD at block 90. Thus, when the recorded image is reproduced, the control unit 16 causes the recorded image to be displayed as is at block 90.

As is apparent from the above description, the present invention provides a DVD recording apparatus and a cell-by-cell edition method using the same, in which a user can record an image by a cell-by-cell edition, and then selectively reproduce any part of a recorded image. Further, since the representative image of each cell is displayed for the purpose of cell-by-cell edition, the user can easily find a content of each cell and can selectively reproduce any part of a recorded image.

While the present invention has been particularly shown and described with reference to exemplary embodiments thereof, it will be understood by those of ordinary skill in the art that various changes in form and details may be made therein without departing from the spirit and scope of the present invention. For example, other recording media, such as DVD, DVD-R, DVD-RW, DVD+RW, DVD-RAM, DVD-ROM, CD, CD-R, CD-RW, CD-ROM and other holographic data storage devices may be utilized, as long as the cell-by-cell editing scheme is implemented in the manner as described with reference to FIG. 2, FIG. 3, FIG. 4, FIG. 5, FIG. 6, FIG. 7 and FIGS. 8A-8B. Similarly, the recorder may be reconfigured to adjust to the new media. Likewise, the system controller can be implemented as a chipset having firmware, or alternatively, a general or special purposed computer programmed to implement methods as described with reference to FIG. 6. In addition, components of a DVD recorder can also be configured differently as shown in FIG. 1. Accordingly, it is intended, therefore, that the present invention not be limited to the various example embodiments disclosed, but that the present invention includes all embodiments falling within the scope of the appended claims.

What is claimed is:

1. A cell-by-cell edition method of a digital versatile disc (DVD) recording apparatus which records images on a DVD in a video format when the DVD is loaded therein, the method comprising:
    recording an image on the DVD, and temporarily storing cell information in relation to a plurality of cells constituting the image;
    displaying representative images of the plurality of cells on a graphical user interface (GUI) which is connected to the DVD recording apparatus; and
    creating navigation data using the cell information when a user edits the plurality of cells while viewing the representative images, and storing the created navigation data on the DVD.

2. The cell-by-cell edition method as claimed in claim 1, wherein the representative images are displayed on the GUI in a thumbnail scheme.

3. The cell-by-cell edition method as claimed in claim 1, wherein the representative images are any one of intra-pictures which belong to a corresponding cell among the plurality of cells.

4. The cell-by-cell edition method as claimed in claim 1, wherein the user manually designates a starting point of each cell when the image is recorded on the DVD.

5. The cell-by-cell edition method as claimed in claim 4, wherein, a recording of a cell under recording is stopped when the user manually designates the starting point of each cell, and the cell information in relation to the recorded cell is stored in a storage medium of the DVD recording apparatus.

6. The cell-by-cell edition method as claimed in claim 1, wherein a starting point of each cell is automatically designated when the image is recorded on the DVD.

7. The cell-by-cell edition method as claimed in claim 6, wherein the starting point of each cell is automatically designated by a predetermined period of time elapsing or by an indication of a scene change in the image.

8. The cell-by-cell edition method as claimed in claim 7, wherein, a recording of a cell under recording is stopped when the starting point of each cell is automatically designated, and the cell information in relation to the recorded cell is stored in a storage medium of the DVD recording apparatus.

9. The cell-by-cell edition method as claimed in claim 1, wherein the navigation data represents program chain information (PGCI).

10. A cell-by-cell edition method of a digital versatile disc (DVD) recording apparatus which records images on a DVD in video format when the DVD is loaded therein, the method comprising:
    recording an image on the DVD, and temporarily storing cell information in relation to a plurality of cells constituting the image;
    displaying representative images of the plurality of cells on a graphical user interface (GUI) which is connected to the DVD recording apparatus; and
    creating navigation data in response to a user's selection using the cell information when the user selects a reproduction or deletion of the plurality of cells while viewing the representative images, and storing the created navigation data on the DVD.

11. A digital versatile disc (DVD) recording apparatus comprising:
    a DVD drive arranged to receive a DVD, for recording an image on the DVD or reading a recorded image from the DVD; and a control unit for storing cell information in relation to a plurality of cells constituting the image, for creating navigation data using the cell information while a user is editing each cell in a cell-by-cell edition, for storing the created navigation data on the DVD, and to display representative images of the plurality of cells on a graphical user interface (GUI) connected to the DVD recording apparatus.

12. The DVD recording apparatus as claimed in claim 11, wherein the cell-by-cell edition is performed to select a deletion or reproduction of each cell.

13. The DVD recording apparatus as claimed in claim 11, wherein the representative images of the plurality of cells is displayed on the GUI in a thumbnail scheme.

14. The DVD recording apparatus as claimed in claim 9, wherein the navigation data represents program chain information (PGCI).

15. A recording apparatus comprising:
a disc drive arranged to receive an optical disc recording, in a video format, at least an image which is composed of a plurality of cells with each cell representing a part of a recorded image; and
a controller arranged to control the disc drive, for enabling a user, during a cell-by-cell edit mode, to selectively reproduce at least a part of the recorded image, via a graphical user interface (GUI).

16. The recording apparatus as claimed in claim 15, wherein the optical disc is a digital versatile disc (DVD) and the controller is further configured to store cell information in relation to the plurality of cells constituting the image, to create navigation data using the cell information while the user edits each cell during the cell-by-cell edit mode, and to store created navigation data on the DVD.

* * * * *